United States Patent
Toleno et al.

(10) Patent No.: US 10,782,534 B1
(45) Date of Patent: Sep. 22, 2020

(54) NEAR EYE DISPLAY (NED) DEVICE HOUSING SHELL INTEGRATED WITH MOLDED BOSS CLUSTERS FOR PRECISION MOUNTING OF HARDWARE COMPONENTS

(71) Applicant: MICROSOFT TECHNOLOGY LICENSING, LLC, Redmond, WA (US)

(72) Inventors: Brian J. Toleno, Cupertino, CA (US); Michael Nikkhoo, Saratoga, CA (US); Michael Neil Beerman, Mill Valley, CA (US); Marianne E. Laford, Palo Alto, CA (US); Igor Markovsky, San Jose, CA (US); Simon Hodgson, Morgan Hill, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/359,853

(22) Filed: Mar. 20, 2019

(51) Int. Cl.
*G02B 27/01* (2006.01)
*B29C 70/20* (2006.01)
*G05B 19/404* (2006.01)

(52) U.S. Cl.
CPC ........ *G02B 27/0176* (2013.01); *B29C 70/205* (2013.01); *G05B 19/404* (2013.01)

(58) Field of Classification Search
CPC ............ G02B 27/0018; G02B 27/0081; G02B 27/017; G02B 27/0172; G02B 27/0176;
(Continued)

(56) References Cited

U.S. PATENT DOCUMENTS 8,185,167 B2  5/2012  Kim et al.
8,199,469 B2  6/2012  Coish et al.
(Continued)

FOREIGN PATENT DOCUMENTS

DE   102013009931 A1   12/2014
EP        2852483 A1    4/2015
(Continued)

OTHER PUBLICATIONS

"International Search Report and Written Opinion Issued in PCT Application No. PCT/US20/022504", dated Jun. 29, 2020, 18 Pages.

*Primary Examiner* — Nelson M Rosario
(74) *Attorney, Agent, or Firm* — Newport IP, LLC; Mike R. Cicero

(57) ABSTRACT

A Near-Eye-Display (NED) device having a housing shell that is integrated with molded boss clusters for precision mounting of hardware components. The techniques disclosed herein include forming a housing shell directly over one or more pre-molded boss clusters that have been inserted into cavities of a housing shell mold core. For example, with the pre-molded boss clusters already inserted into the cavities, a selected housing shell material such as a thermosetting epoxy resin impregnated carbon fiber reinforced (CFRP) fabric may be thermal compression molded over the housing shell mold core. Individual ones of the pre-molded boss clusters include one or more "three-dimensional (3D)" bosses for mounting various hardware components of the NED device. The bosses may protrude from an inner surface of the housing shell and may provide interior mounting features without affecting the appearance of the outer surface of the housing shell.

16 Claims, 6 Drawing Sheets

(58) Field of Classification Search
CPC .............. G02B 27/1086; G02B 27/283; G02B
5/1823; G02B 5/1857; G02B 5/1866;
G02B 5/1871; G02B 5/3025; G02B
6/0016; G02B 6/0023; G02B 6/0035;
G02B 6/0036; G02B 6/0038; G02B
6/005; G02B 6/0076; G02B 7/008; G02B
2027/0114; G02B 2027/0118; G02B
2027/012; G02B 2027/0125; G02B
2027/014; G02B 2027/0174; G02B
2027/0178; G02B 27/30; G02B 6/29325;
G02B 6/34; G02C 11/10; G02C 5/16;
G06F 1/163; G06F 1/203; G06F 1/206;
G06F 3/011; G06F 3/013; G06F 3/147;
G09G 3/001; G09G 3/002; G09G 3/2003;
G09G 3/2044; G09G 2320/0233; G09G
2330/045; G09G 2340/0464; H04N
9/3102; H04N 9/3164; H04N 9/3144;
H05K 7/20963
See application file for complete search history.

(56) References Cited

U.S. PATENT DOCUMENTS

| | | | |
|---|---|---|---|
| 8,309,864 | B2 | 11/2012 | Kobayashi et al. |
| 9,205,579 | B2 | 12/2015 | Gideon et al. |
| 9,274,568 | B2 | 3/2016 | Pegg et al. |
| 9,498,907 | B2 | 11/2016 | Yoo et al. |
| 9,801,294 | B2 | 10/2017 | Wang |
| 2002/0106952 | A1 | 8/2002 | Hashizume et al. |
| 2018/0052501 | A1* | 2/2018 | Jones, Jr. .......... A61B 17/07207 |
| 2018/0302704 | A1* | 10/2018 | Yang ..................... G02B 27/01 |
| 2019/0377189 | A1 | 12/2019 | Toleno et al. |

FOREIGN PATENT DOCUMENTS

| | | |
|---|---|---|
| EP | 3248044 A1 | 11/2017 |
| FR | 3038248 B1 | 12/2017 |
| JP | S6342843 A | 2/1988 |
| JP | 2013056474 A | 3/2013 |
| WO | 2013142559 A2 | 9/2013 |
| WO | 2018069225 A1 | 4/2018 |

\* cited by examiner

NEAR EYE DISPLAY (NED) DEVICE HOUSING SHELL INTEGRATED WITH MOLDED BOSS CLUSTERS FOR PRECISION MOUNTING OF HARDWARE COMPONENTS

BACKGROUND

Conventional Near-Eye-Display (NED) devices include numerous hardware components that are tightly packed within a component housing. The component housing is an important part of most NED devices since it both protects the enshrouded hardware components while also serving aesthetic purposes. Typically, the component housing and the numerous hardware components enshrouded thereby are all mounted to a dedicated support structure. The dedicated support structure is, in most cases, an injection molded plastic component to which hardware components are first mounted. After the hardware components are mounted to the dedicated support structure, the component housing is then mounted to the same dedicated support structure to enshroud the numerous hardware components while providing the desired aesthetic appearance.

There are disadvantages to such NED device housing configurations. One such disadvantage is that these configurations are ill-suited to achieve and maintain precise positional relationships between the various hardware components and the component housing. For example, mounting the hardware components to the component housing indirectly via the support structure results in a geometric tolerance stack up between the hardware components and the component housing. Moreover, the injection molded materials used to form both the component housing and the support structure are typically highly susceptible to thermal expansion so that even during operation the positional relationship between components is unstable. Other disadvantages include that dedicated support structures inherently add to the overall weight of the NED device and also constrains the ability of designers to miniaturize the NED device.

It is with respect to these considerations and others that the disclosure made herein is presented.

SUMMARY

Technologies described herein provide for a Near-Eye-Display (NED) device having a housing shell that is integrated with molded boss clusters for precision mounting of hardware components. Generally described, the techniques disclosed herein include forming a housing shell directly over one or more pre-molded boss clusters that have been inserted into cavities of a housing shell mold core. For example, with the pre-molded boss clusters already inserted into the cavities, a selected housing shell material such as a thermosetting epoxy resin impregnated carbon fiber reinforced (CFRP) fabric may be thermal compression molded over the housing shell mold core. Individual ones of the pre-molded boss clusters include one or more "three-dimensional (3D)" bosses for mounting various hardware components of the NED device. The bosses may protrude from an inner surface of the housing shell and may provide interior mounting features without affecting the appearance of the outer surface of the housing shell.

In some embodiments, after a thermal compression molding process is completed to integrate the pre-formed boss clusters with the housing shell, the housing shell and the boss clusters may be jointly machined to include various features such as, for example, mounting threads and sensor apertures. In this way, the various machined features can be located with respect to one another to a much higher degree of precision than in conventional NED devices since the effect of geometric tolerance stack up is mitigated. Additionally, the weight of the NED device is reduced since the techniques disclosed herein obviate the need for a dedicated support structure to which a component housing and hardware components are commonly mounted. Other advantages of integrating the boss clusters with the component housing through the novel molding techniques described herein include reducing the overall weight of the NED device and enabling designers to further miniaturize the NED device.

In an exemplary embodiment, the boss clusters may be pre-formed to include mounting surface(s) that substantially match a profile (e.g., surface shape) of the portions of the housing shell at which the boss clusters are to be integrated via compression molding. Individual boss clusters may include a plurality of bosses that protrude from the mounting surface(s). Different ones of the bosses may protrude to a variety of distances from the mounting surface(s). Additionally, or alternatively, different ones of the bosses may protrude to a common distance from the mounting surface(s). In some embodiments, ends of the bosses that are opposite the mounting surface include metallic inserts which may ultimately be tapped to include mounting threads. An exemplary boss cluster may be formed by placing a metallic insert into a mold and then injection molding a carbon-filled thermoplastic material into the mold over and around the insert. After being shot into the mold, the carbon-filled thermoplastic material cools and hardens over the insert—the resulting structure being a boss cluster as described herein.

In the exemplary embodiment, the housing shell may be formed over the boss cluster via a molding process that causes the mounting surface of each individual boss cluster to become substantially adhered to a predetermined region of the housing shell. Prior to the molding process, the individual pre-molded boss clusters are each inserted into corresponding boss cluster cavities of a housing shell mold core. To achieve a smooth and uniform outer surface of the end product, the mounting surface(s) of each individual pre-molded boss cluster may substantially match a profile of the housing shell mold core that surrounds the corresponding boss cluster cavity. For example, upon inserting a pre-molded boss cluster into a boss cluster cavity of the housing shell mold core, the mounting surface of the pre-molded boss cluster may coincide with a curvature of the housing shell mold core that immediately surrounds the boss cluster cavity. With the pre-molded boss clusters inserted into the boss cluster cavities, both the housing shell mold core and the pre-molded boss clusters may be covered with a housing shell material. As a specific example, one or more sheets of a thermosetting epoxy resin impregnated CFRP fabric may be draped over both the housing shell mold core and the pre-molded boss clusters.

In the exemplary embodiment, a molding process may then be performed to simultaneously form the housing shell while integrating the same with the pre-molded boss clusters for precision mounting of hardware components within a NED device. The molding process may be a thermal compression molding process that includes compressing the housing shell material between the housing shell mold core and a housing shell mold cavity while concurrently applying an appropriate amount of heat to cause the housing shell material to cure in the compressed shape. Following the molding process, the housing shell material may have been hardened into a 3D form that matches the surfaces of the housing shell mold core and housing shell cavity against which the housing shell material was compressed. Moreover, the housing shell material curing while simultaneously being compressed against the mounting surfaces of the pre-molded boss clusters causes the pre-molded boss to become securely adhered to the cured housing shell material. To illustrated, suppose that the housing shell material is a thermosetting epoxy resin impregnated CFRP fabric and the boss clusters are formed from a carbon-filled thermoplastic. Further suppose that, the amount of heat applied may be enough to liquify and initiate irreversible curing of the thermosetting epoxy resin but not enough to liquify the pre-molded boss clusters. While in the heated liquid form and while under the pressure exerted by the mold, the liquified thermosetting epoxy resin may flow into any geometrical imperfections of the mounting surface. Then, when solidified back into solid form, the thermosetting epoxy resin of the CFRP fabric adheres to the geometrical imperfections so that the pre-molded boss clusters are integrated into the housing shell. In some cases, the mounting surfaces of the pre-formed boss clusters may be roughened to increase adhesion.

After completion of the molding process during which the housing shell is both solidly formed and adhered to the pre-molded boss clusters, various features may be jointly machined into the shell housing and/or the pre-molded boss clusters. For example, the bosses of the pre-molded boss clusters may be milled flat, drilled, and then tapped to produce flat mounting surfaces to which various hardware components are to be secured. Additionally, or alternatively, one or more through sensor apertures may be machined into the housing shell to provide a view of an external real-world environment to one or more sensors that are to be mounted internal to the housing shell. As a specific but non-limiting example, the shell housing and integrated boss clusters may be affixed to a machine bed of a multi-axis computer numerical control (CNC) machine. Then, the multi-axis CNC machine may be caused to run one or more CNC programs to flatten and tap the bosses and also to cut one or more holes into the housing shell so serve as sensor apertures. It will be appreciated that since the one or more CNC programs may be used to machine features into the housing shell and also one or more boss clusters without removing the same from the machine bed, the various machined features can be located with respect to one another to a much higher degree of precision than in conventional NED devices since the effect of geometric tolerance stack up is mitigated.

Following completion of the one or more CNC programs, hardware components of the NED device may be mounted to the bosses that are now integrated directly into the housing shell. As a specific but non-limiting example, one or more sensors may be mounted into a sensor aperture by fastening the sensors to bosses that are located adjacent to the sensor aperture. Additionally, or alternatively, a display may be mounted to one or more bosses and may protrude out of a lower portion of the housing shell, e.g. into a field of view of a user if the NED device is being worn by the user. In this way, the housing shell serves as a support structure while also serving both protective and aesthetic purposes.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number followed by a parenthetical containing a number of a sequence of numbers to refer to each individual item. Generic references to the items may use the specific reference number without the sequence of numbers. For example, the items may be collectively referred to with the specific reference number preceding a corresponding parenthetical containing a sequence number.

DETAILED DESCRIPTION

The following Detailed Description describes technologies for a Near-Eye-Display (NED) device having a housing shell that is integrated with boss clusters for precision mounting of hardware components. Generally described, the techniques disclosed herein include processes for inserting boss clusters into a boss clusters cavity of a housing shell mold core and then molding a housing shell directly over the boss clusters and the housing shell mold core. Individual ones of the boss clusters include "three-dimensional (3D)"

bosses for mounting various hardware components of the NED device. The bosses may protrude from an inner surface of the housing shell to provide interior mounting features without affecting the appearance of the outer surface of the housing shell.

In some embodiments, the housing shell and/or the boss clusters may be jointly machined to include various features after a thermal compression molding process has been completed to integrate the boss clusters with the housing shell. Exemplary such machined features include, but are not limited to, mounting threads on the bosses as well as sensor apertures through the housing shell. Since the machined features are applied to both the housing shell and the boss clusters after they have been integrated into a single component, the relative location of the machined features remains practically static. In this way, the various machined features can be located with respect to one another to a much higher degree of precision than in conventional NED devices since the effect of geometric tolerance stack up is mitigated. Additionally, the weight of the NED device is reduced since the techniques disclosed herein obviate the need for a dedicated support structure to which a component housing and hardware components are commonly mounted.

Figure 1A:
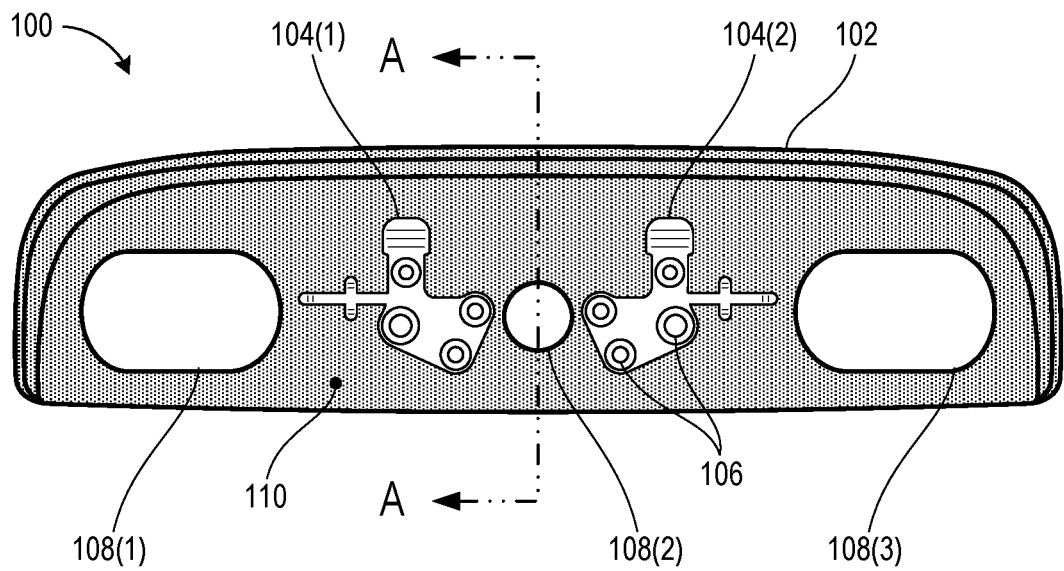
FIG. 1A is a rear view of an exemplary NED device housing that includes a housing shell that is integrated with one or more boss clusters for precision mounting of hardware components.
Figure 3B:
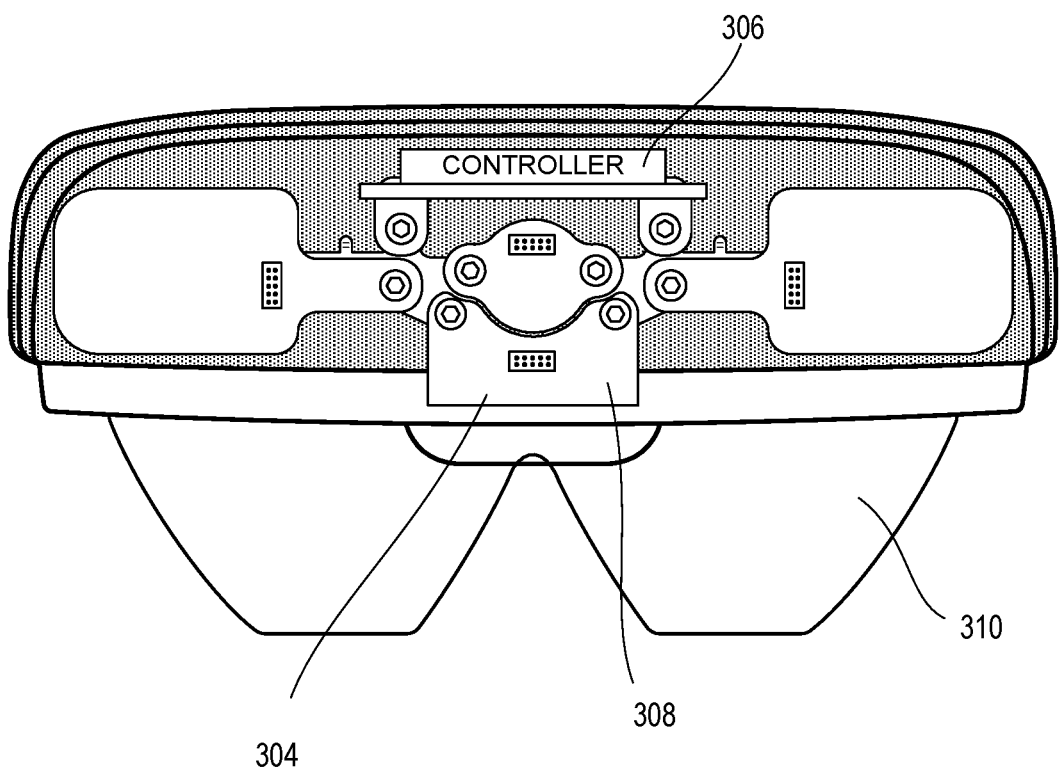
FIG. 3B illustrates a rearview of the exemplary NED device housing with a display component and a controller mounted to the boss clusters in addition to the one or more sensor components that are shown in FIG. 3A.
Figure 4:
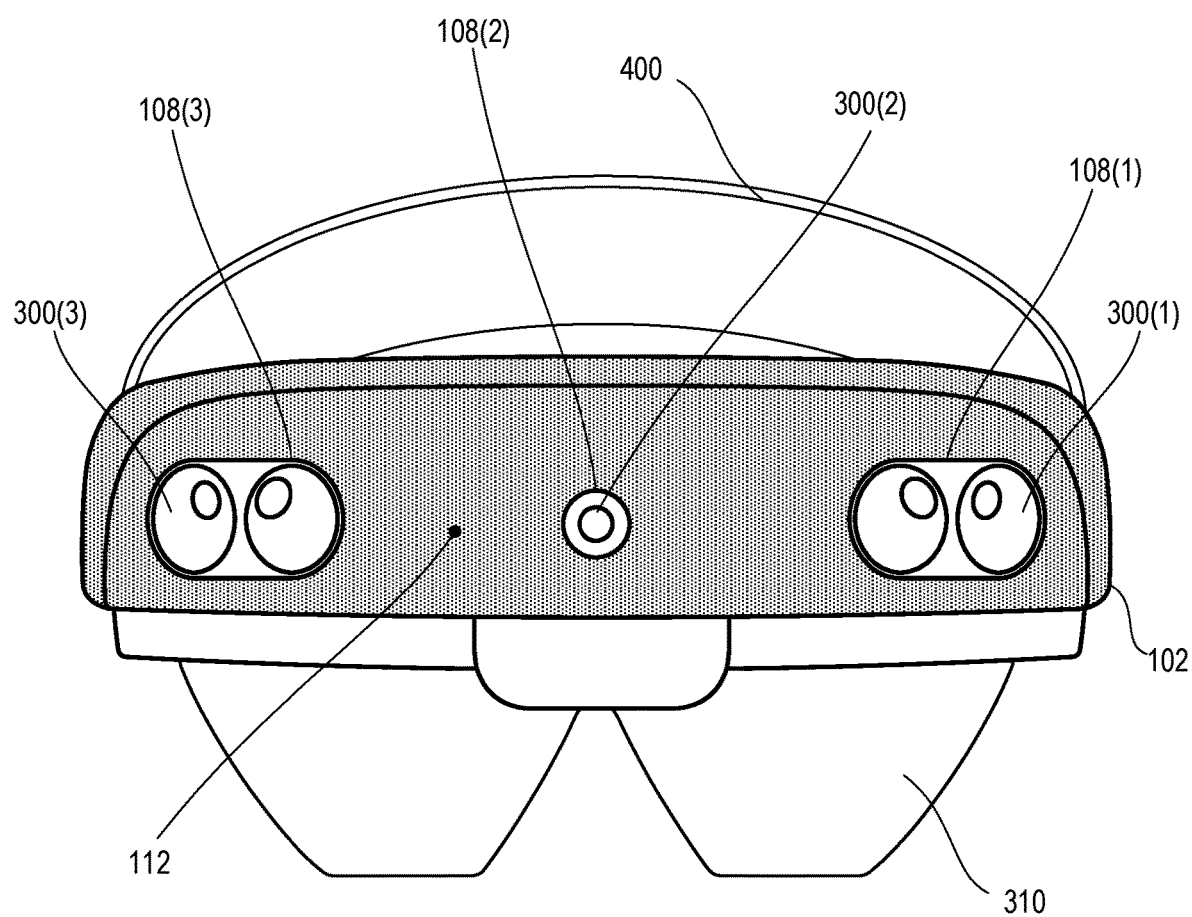
FIG. 4 illustrates a front view of the exemplary NED device housing with the display component, the controller, and the sensor components all internally mounted to the boss clusters.

FIG. 1A is a rear view of an exemplary NED device housing 100 that includes a housing shell 102 that has been molded over and integrated with one or more boss clusters 104 for precision mounting of hardware components of a NED device. An exemplary such NED device may include a display component (e.g., as shown in FIGS. 3B and 4) and various computing hardware components that, either individually or in combination, are configured to cause the display component to render computer generated images in front of a user's eye(s). For example, an exemplary NED device can be used for augmented reality (AR) and/or virtual reality (VR) applications. It will be appreciated that in AR-type NED devices, the display component may be a transparent display element that enables the user to concurrently see both the real-world environment surrounding her as well as AR content generated by the display component.

As illustrated, the NED device housing 100 includes a first molded boss cluster 104(1) and a second molded boss cluster 104(2) both of which are integrated into the housing shell 102. Each of the boss clusters 104 includes one or more bosses 106 for mounting various hardware components (e.g., sensors, displays, System-On-Chip components, motherboards, etc.) to the NED device housing 100. In the illustrated embodiment, each of the boss clusters 104 includes four (4) bosses 106—only two (2) of which are labeled to reduce illustrative clutter. In various embodiments, the one or more boss clusters 104 may pre-formed via an injection molding process that includes melting a thermoplastic and then injecting the resulting molten thermoplastic into a mold that is specifically shaped to form the desired bosses 106. The housing shell 102 may then be formed by thermal compression molding one or more sheets of housing shell material directly over both of a housing shell mold core and also the pre-molded boss clusters—which may be inserted into one or more cavities of the housing shell mold core. As described herein, the thermal compression molding process may be used to form and cure a resin of the housing shell material into the desired housing shape (e.g., as defined by the housing shell mold core and corresponding housing shell mold cavity) and also to simultaneously cause the resin to adhere to the boss clusters 104. In this way, the housing shell 102 and integrated boss clusters 104 are enabled to together serve the purpose of being a support onto which the various hardware components are mounted.

In some embodiments, the boss clusters 104 may be formed of a first material that is optionally reinforced with a filler material (e.g., glass, carbon, etc.) to minimize the coefficient of thermal expansion (CTE) of the boss clusters 104. For example, the boss clusters 104 may be formed of a carbon-filled thermoplastic material such as polyetherimide (PEI) materials that belong to the ULTEM™ resin family or polybutylene terephthalate materials that belong to the VALOX® resin family. These specific materials are provided for illustrative purposes only and are not to be construed as limiting. Rather, the boss clusters 104 may be formed from any other material that provides suitable mechanical strength and thermal resistive properties. Moreover, as described in more detail below with relation to FIGS. 5A and 5B, one or more of bosses 106 on the boss clusters 104 may be formed over one or more metallic inserts. Then, after molding the bosses 106 over the metallic inserts, the metallic inserts may be machined flat, drilled, and then tapped to produce flat mounting surfaces to which various hardware components of a NED device are to be secured.

In some embodiments, the housing shell 102 may be formed of a second material that is optionally reinforced with a filler material (e.g., glass, carbon, etc.) to minimize the coefficient of thermal expansion (CTE) of the housing shell 102. For example, the housing shell 102 may be formed of a carbon fiber reinforced polymer (CFRP) fabric that includes a multidirectional weave of carbon fibers and a thermoset epoxy resin.

In various embodiments, the first material that is used to form the boss clusters 104 may have a higher thermal resistance than the second material that is used to form the housing shell 102. As a specific but nonlimiting example, the first material may include a thermoplastic polymer material that becomes pliable or moldable upon being heated above a particular temperature and solidifies upon being cooled below the particular temperature (e.g., a thermo-softening plastic). Continuing with the specific but nonlimiting example, the second material may include a thermosetting polymer that includes a resin-type polymer that is initially in the form of a soft solid or viscous liquid prepolymer that is caused to irreversibly cure by application of heat. In this example, the temperature at which the first material becomes pliable or moldable may be greater than the temperature that induces the irreversible curing of the second material. In this way, the housing shell 102 may be formed by thermal compression molding one or more sheets of housing shell material directly over the boss clusters 104 without impacting structural integrity and/or shape of the boss clusters 104.

As further illustrated in FIG. 1A, in some embodiments the exemplary NED device housing 100 includes one or more sensor apertures 108 within the housing shell 102. In the specific illustrated embodiment, the exemplary NED device housing 100 includes a first sensor aperture 108(1), a second sensor aperture 108(2), and a third sensor aperture 108(3). As described in more detail below in relation to FIGS. 3A-4, one or more sensor components may be mounted to various ones of the bosses 106 and may be disposed over individual ones of the sensor apertures 108.

Figure 1B:
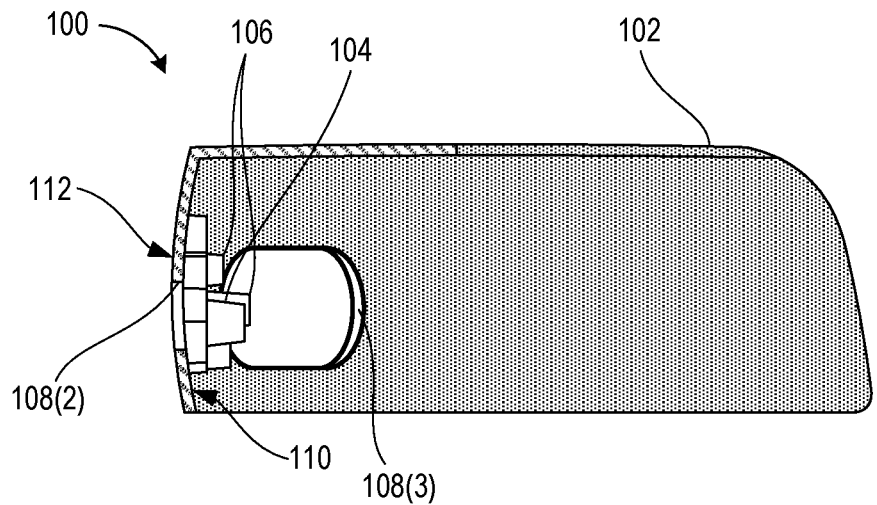
FIG. 1B is a side cutaway-section view of the exemplary NED device housing of FIG. 1A taken along the line A-A shown in FIG. 1A.

Turning now to FIG. 1B, illustrated as a side cutaway-section view of the exemplary NED device housing 100 of FIG. 1A that is taken along the line A-A shown in FIG. 1A. as shown in FIG. 1B, the boss clusters 104 are integrated onto an interior surface 110 of the housing shell 102. Since the boss clusters 104 are adhered to the inner surface 110 of the housing shell 102 and do not rely upon fasteners extending through the housing shell 102, the individual bosses 106 protrude from the inner surface of the housing shell 102 to provide interior mounting features without affecting the appearance of the outer surface 112 of the housing shell 102.

Figure 2A:
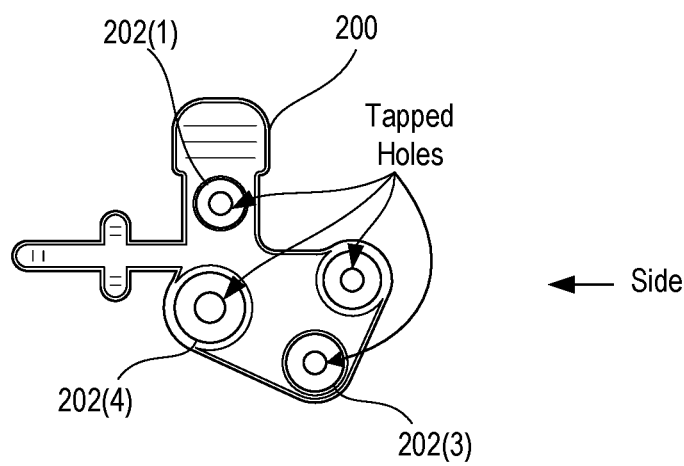
FIG. 2A illustrates a top view of an exemplary boss cluster that includes four individual bosses that vary in size and height.
Figure 2B:
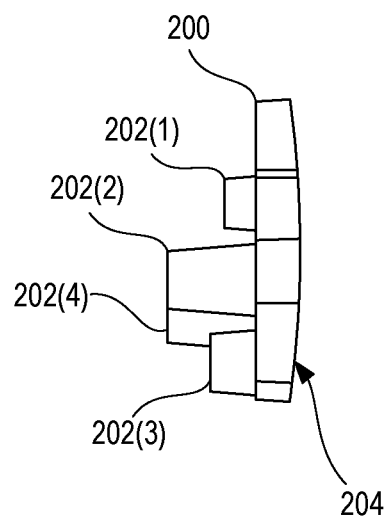
FIG. 2B is a side view of the exemplary boss cluster of FIG. 2A.
Figure 2C:
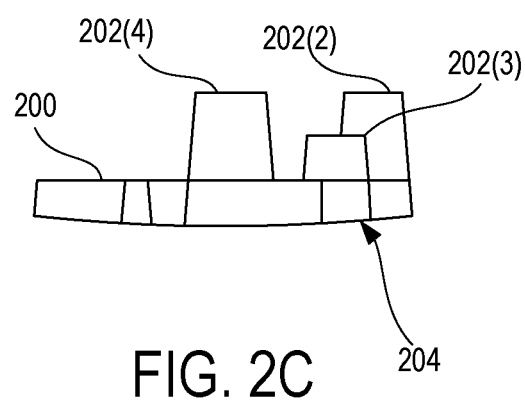
FIG. 2C is a top view of the exemplary boss cluster of FIG. 2A.

Turning now to FIG. 2A, illustrated is a top view of an exemplary boss cluster 200 that includes four individual bosses 202 that vary in size and height. FIG. 2B is a side view of the exemplary boss cluster 200 of FIG. 2A. FIG. 2C is a top view of the exemplary boss cluster 200 of FIG. 2A.

In various embodiments, different ones of the individual bosses 202 may protrude to a variety of distances from a mounting surface 204 of the boss cluster 200. Additionally, or alternatively, different ones of the individual bosses 202 may protrude to a common distance from the mounting surface 204. For example, as shown in FIGS. 2A through 2C, both of the fourth boss 202(4) and the second boss 202(2) protrude to a greater distance from the mounting surface 204 of the boss cluster 200 than the first boss 202(1) and the third boss 202(3). Moreover, the third boss 202(3) protrude to a greater distance from the mounting surface 204 in the first boss 202(1). Alternatively, different ones of the individual bosses 202 may protrude to a common distance from the mounting surface 204.

In various embodiments, the mounting surface 204 of the boss cluster 200 may be configured with the predetermined curvature that specifically matches a profile of the housing shell 102 that will ultimately be integrated with the boss cluster 200. For example, in embodiments where the housing shell 102 is formed directly over the boss cluster 200 while it is inserted into a housing shell mold core, the mounting surface 204 of the boss cluster 200 may substantially match a profile of the housing shell mold core and the housing shell mold cavity that ultimately presses the housing shell material against the housing shell mold core. It will be appreciated by one skilled in the art of thermal compression molding that matching the curvature of the mounting surface 204 with that of the housing shell mold core and/or housing shell mold cavity will provide for a smoothie and uniform curvature of the outer surface 112 of the housing shell 102 after the thermal compression molding process is completed. Thus, following the thermal compression molding process, a resulting NED device housing may be machined (e.g., to form sensor apertures 108 and/or to flatten and tap the individual bosses 202) and painted to yield a resulting NED device housing having a smooth exterior surface that provides no evidence of interior mounting features being integrated into the housing shell.

Figure 3A:
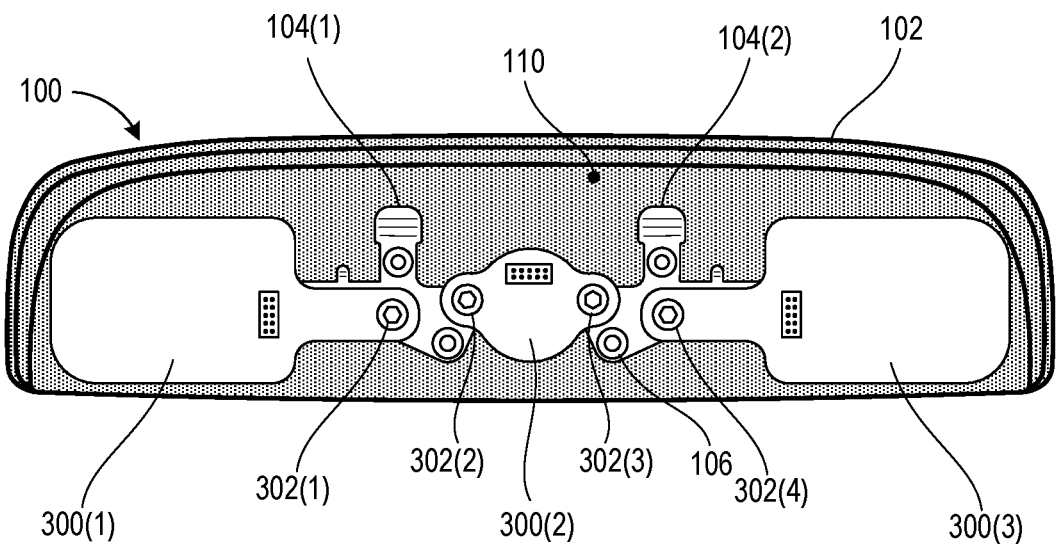
FIG. 3A illustrates a rear view of the exemplary NED device housing shown in FIG. 1A with one or more sensor components mounted to the boss clusters that are integrated into the housing shell.

Turning now to FIG. 3A, illustrated is a rearview of the exemplary NED device housing 100 that is shown in FIG. 1A with one or more sensor components 300 mounted to the boss clusters 104 that are integrated into the housing shell 102. More specifically, FIG. 3A illustrates a first sensor component 300(1) that is directly mounted to a boss on the first boss cluster 104(1), a second sensor component 300(2) that is directly mounted to bosses on both the first boss cluster 104(1) and the second boss cluster 104(2), and a third sensor component 300(3) that is directly mounted to a boss on the second boss cluster 104(2). Although present in the exemplary NED device housing 100 that is shown in FIG. 1A and thus FIG. 3A, it will be appreciated that each of the first through third sensor apertures 108 are concealed by sensor components 300 and FIG. 3A. Thus, the sensor apertures 108 are neither illustrated nor labeled in FIG. 3A.

As illustrated, the first sensor component 300(1) is secured to a boss of the first boss cluster 104(1) with a first fastener 302(1) that securely holds the first sensor component 300(1) over the first sensor aperture 108(1) that has been machined into the housing shell 102. Furthermore, the second sensor component 300(2) is secured to the first boss cluster 104(1) with a second fastener 302(2) and is further secured to the second boss cluster 104(2) with a third fastener 302(3). The second sensor component 300(2) securely maintained over the second sensor aperture 108(2). Finally, the third sensor component 300(3) is secured to a boss of the second boss cluster 104(2) with a fourth fastener 302(4) that securely holds the third sensor component 300 (3) over the third sensor aperture 108(3).

Exemplary sensor components 300 that may be mounted to the boss clusters 104 include, but are not limited to, depth sensing cameras for sensing a depth of a real-world environment as measured from the NED device, color video cameras or capturing color image frames of the real-world environment from the perspective of the NED device, stereo vision cameras, and/or structured light sensors. These types of exemplary sensor components may be deployed by the NED device to perform a variety of functions such as, for example, spatial mapping to create a real-time environmental mesh of the real-world environment from the perspective of the NED device, hand tracking to monitor hand movements and/or gestures that can be translated to user-computer inputs, and/or eye tracking to monitor eye movements of a user that is wearing the NED device.

Turning now to FIG. 3B, illustrated is a rearview of the exemplary NED device housing 100 with a display component 304 and a controller 306 mounted to the boss clusters 104 in addition to the one or more sensor components 300 shown in FIG. 3A. As illustrated, the exemplary NED device is an Augmented-Reality (AR) type NED device that is configured to render imagery within the user's field of view during operation (e.g., to facilitate an augmented or mixed reality experience). For this reason, the display component 304 protrudes downward from the location at which it is mounted to the boss clusters 104 and into the user's field of view. An exemplary such display component 304 that may be used in various NED applications is a transparent waveguide display having diffractive optical elements (DOEs) for redirecting light toward a user's eyes. The light that is redirected may be generated within a light engine 308 that is disposed within the interior region of the housing shell 102 and may be directed through the one or more DOEs into a transparent waveguide 310. The specific components that are shown mounted to the boss clusters 104 in FIGS. 3A and 3B are for illustrative purposes only. In various embodiments, one or more of the components shown may be omitted and/or other components may be included such as, for example, random access memory (RAM), central processing units (CPUs), graphics processing units (GPUs), holographic processing units (HPUs), batteries, and so on.

Turning now to FIG. 4, illustrated is a front view of the exemplary NED device housing 100 with the display component 304, the controller 306, and the sensor components 300 all internally mounted to the boss clusters 104. Also illustrated in FIG. 4 is a head strap 400 that is configured to securely mount the exemplary NED device to a head of a user during operation. Since the boss clusters 104 are adhered to the inner surface (not visible in FIG. 4) of the housing shell 102 and do not rely upon fasteners extending through the housing shell 102, the various components may be mounted to the individual bosses 106 within the inner region of the NED device housing 100 without affecting the appearance of the outer surface 112 of the housing shell 102.

Figure 5A:
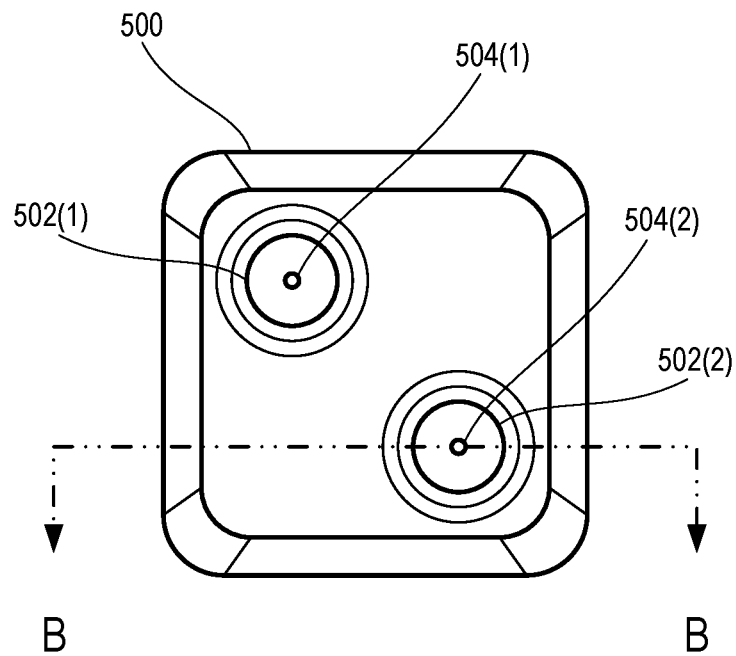
FIG. 5A illustrates a top view of an exemplary boss cluster that includes two individual bosses that have each been formed over individual metallic inserts.
Figure 5B:
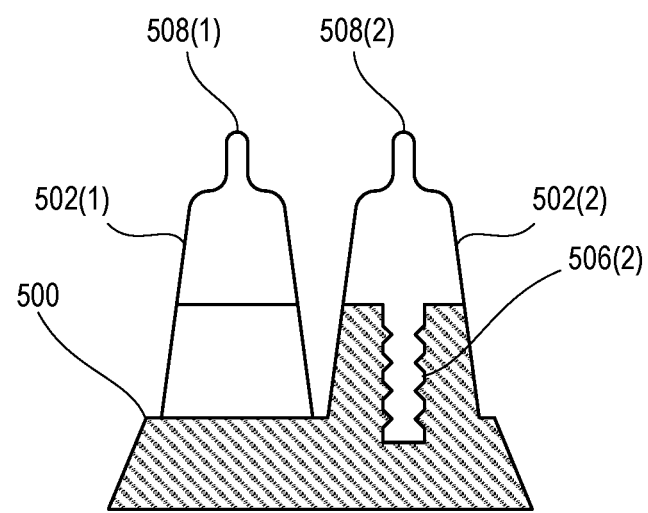
FIG. 5B is a side cutaway-section view of the exemplary boss cluster of FIG. 5A taken along the line B-B shown in FIG. 5A.

FIG. 5A illustrates a top view of an exemplary boss cluster 500 that includes two individual bosses 502 that have each been formed over individual metallic inserts 504. FIG. 5B is a side cutaway-section view of the exemplary boss cluster 500 of FIG. 5A taken along the line B-B shown in FIG. 5A. The exemplary boss cluster 500 may be formed by placing the metallic inserts 504 into a mold cavity and then injecting a melted thermoplastic (e.g., a thermoplastic that is currently above the heat deflection temperature) into the mold cavity around studs 506 of the metallic inserts 504. It should be appreciated that since the line B-B dissects the second boss 502(2) and second metallic insert 504(2), only the stud 506(2) of the second metallic insert 504(2) is visible.

In the illustrated example, the metallic inserts 504 each include an alignment pin 508 to assist with properly aligning the metallic inserts 504 within a mold prior to injecting the melted thermoplastic material around the metallic inserts 504. As described above, various portions of the metallic inserts 504 including, but not limited to, the alignment pin 508 may be milled flat, drilled, and/or tapped with threads flat mounting surfaces to which various hardware components are to be secured. For example, after the exemplary boss cluster 500 is pre-formed and then integrated with a housing shell through the thermal compression molding techniques described herein, then a multi-axis CNC machine may be caused to run one or more CNC programs to flatten and tap the bosses indoor to cut one or more holes into the housing shell so serve as sensor apertures.

Figure 6:
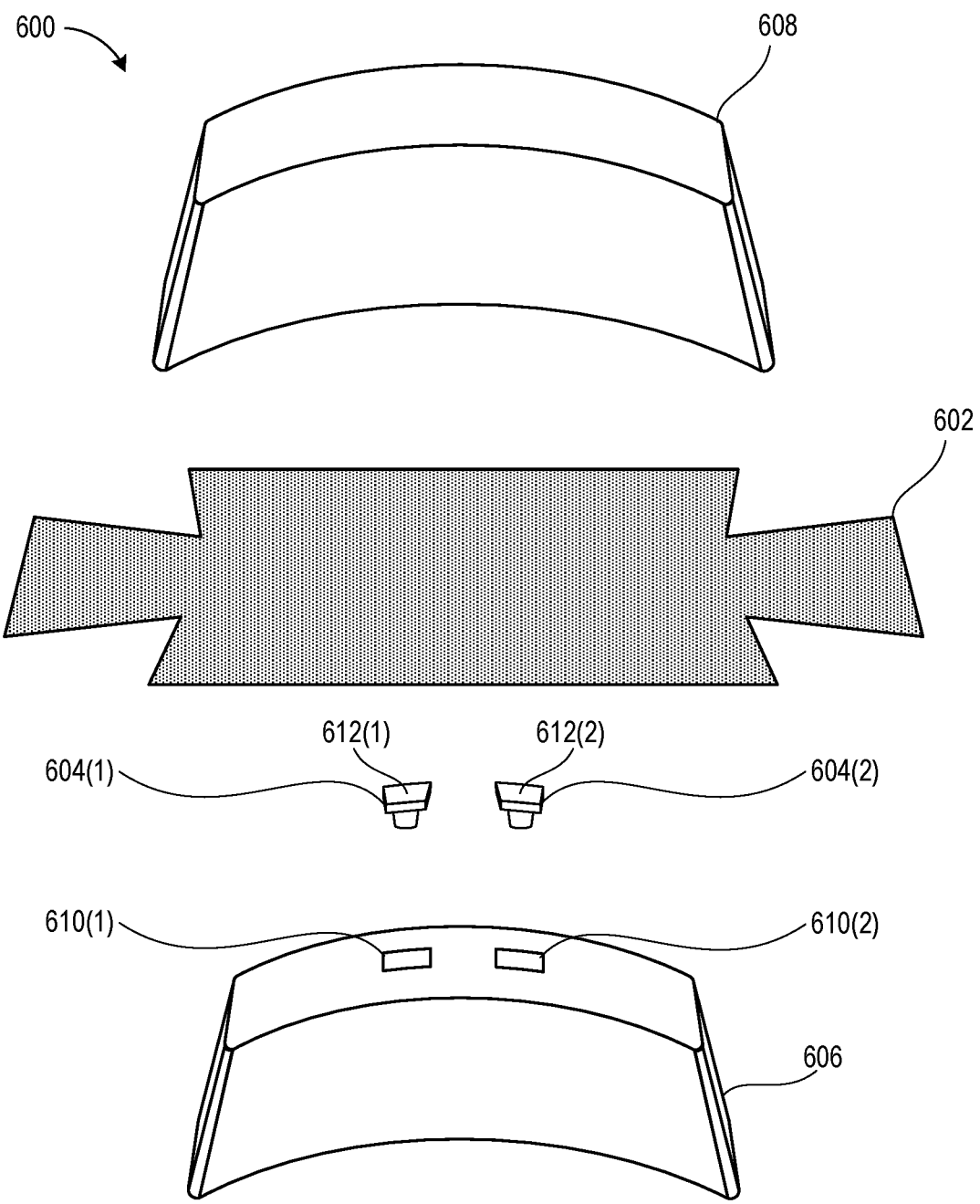
FIG. 6 illustrates an exploded view of a sheet of uncured housing shell material and a pair of boss clusters disposed between a housing shell mold core and a housing shell mold cavity.

Turning now to FIG. 6, illustrated is an exploded view 600 of the sheet of uncured housing shell material 602 and a pair of boss clusters 604 disposed between a housing shell mold core 606 and a housing shell mold cavity 608. The exploded view 600 is discussed in relation to an exemplary thermal compression molding process for forming a housing shell from the housing shell material 602 and also integrating deformed housing shell with the era boss clusters 604.

As illustrated, the housing shell mold core 606 includes one or more boss cluster cavities 610 into which individual ones of the boss clusters 604 snugly fit. Thus, an initial step of the thermal compression molding process may be to insert the individual boss clusters 604 into the boss cluster cavities 610 of the housing shell mold core 606. As described above, the mounting surfaces 612 of the pre-molded boss clusters may substantially match a profile of the housing shell mold core 606 that surrounds the corresponding boss cluster cavities 610. For example, upon inserting a pre-molded boss cluster 604 into a boss cluster cavity 610 of the housing shell mold core 606, the mounting surfaces 612 of the pre-molded boss clusters 604 may coincide with a curvature of the housing shell mold core 606 that immediately surrounds the boss cluster cavities 610. To illustrate this point, suppose that after the pre-molded boss clusters 604 are inserted into the boss cluster cavities 610, sliding your fingertips over the housing shell mold core 606 and inserted pre-molded boss clusters 604 would feel smooth and would not reveal noticeable indentations into and/or protrusions out of the boss cluster cavities 610 or even any abrupt change in curvature. In some embodiments, the mounting surfaces 612 of the pre-molded boss clusters may be slightly proud of the profile of the housing shell mold core 606 that surrounds the corresponding boss cluster cavities 610. For example, the mounting surfaces may protrude one-half millimeters out from the profile of the housing shell mold core 606 that surrounds the corresponding boss cluster cavities 610. In this way, adhesion may be promoted between the mounting surfaces 612 of the pre-molded boss clusters and the curing housing shell material.

After inserting the pre-molded boss clusters 604 inserted into the boss cluster cavities 610, the one or more sheets of housing shell material 602 may be disposed over both the housing shell mold core 606. In an exemplary embodiment, the housing shell material may be a carbon fiber reinforced polymer (CFRP) fabric that is impregnated with or otherwise includes a thermoset polymer resin in an uncured state. In this way, the sheets of housing shell material 602 are highly pliable and can be draped over, wrapped around, or otherwise caused to substantially comply to the outer shape of the housing shell mold core 606.

Then, the housing shell mold cavity 608 and the housing shell mold core 606 may be pressed together to compress the one or more sheets of housing shell material 602 into the desired shape. It will be appreciated that although the inner portion of the housing shell mold cavity 608 is not shown, the shape of this inner portion will substantially match (but maybe slightly larger than) the outer surface of the housing shell mold core 606. For example, when the housing shell mold cavity in the housing shell mold core 606 are brought together a substantially uniform gap of one to two millimeters may be present there between.

With the uncured housing shell material 602 compressed by the housing shell mold cavity against the housing shell mold core 606 and the mounting surfaces 612 of the pair of boss clusters 604, heat may be applied to initiate curing of the housing shell material 602. It will be appreciated that application of heat to the uncured housing shell material 602 may result in various chemical reactions that create extensive cross-linking between polymer chains to produce a rigid NED housing of the desired shape. Moreover, the thermal curing of the housing shell material 602 while simultaneously pressing the same against the mounting surfaces 612 of the pre-molded boss clusters 604 causes the pre-molded boss clusters 604 to become securely adhered to the cured housing shell material 602 once it reaches the resulting cured form.

The pre-molded boss clusters 604 may be formed of a first material that reinforced with a carbon-based filler material to minimize the coefficient of thermal expansion (CTE). As a specific but non-limiting example, the pre-molded boss clusters 604 may be formed of a carbon-filled thermoplastic material such as polyetherimide (PEI) materials that belong to the ULTEM™ resin family or polybutylene terephthalate materials that belong to the VALOX® resin family.

The housing shell material 602 may be a second material that is also reinforced with a carbon-based filler material to minimize the coefficient of thermal expansion (CTE) of the housing shell that results from curing the housing shell material 602. As a specific but non-limiting example, the housing shell may be formed of a carbon fiber reinforced polymer (CFRP) fabric that includes a multidirectional weave of carbon fibers that are weaved throughout a thermoset epoxy resin.

The first material from which the pre-molded boss clusters 604 are formed may have a thermal resistance such that a heat deflection temperature of the first material is higher than the temperature that initiates the curing of the second material. As a specific but nonlimiting example, the first material may include a thermoplastic polymer material that becomes pliable or moldable upon being heated above a first temperature and then solidifies upon being cooled below the first temperature (e.g., a thermo-softening plastic). At the same time, the second material may include a thermosetting polymer that includes a resin-type polymer that is initially in the form of a soft solid or viscous liquid prepolymer and is later caused to irreversibly cure when raised to a second temperature that is less than the first temperature.

Thus, with the uncured housing shell material 602 compressed by the housing shell mold cavity 608 against the housing shell mold core 606 and the mounting surfaces 612 of the pair of boss clusters 604, the uncured housing shell material 602 may be heated to the second temperature without melting the pre-molded boss clusters 604—since they will remain below the first temperature. In this way, the housing shell may be formed by thermal compression molding one or more sheets of housing shell material 602 directly over the boss clusters 604 without impacting structural integrity and/or shape of the boss clusters 604. Moreover, it will be appreciated that since many thermosetting polymers have very good adhesion properties that result from thermally curing the material whilst compressed against a solid structure, the pre-molded boss clusters 604 will become securely adhered to the cured housing shell material 602 once it reaches the resulting cured form.

After completion of the thermo compression molding process described in relation to FIG. 6, various features may be precisely machined into the shell housing and/or the pre-molded boss clusters. For example, the bosses of the pre-molded boss clusters may be milled flat, drilled, and then tapped to produce flat mounting surfaces to which various hardware components are to be secured. Additionally, or alternatively, one or more through sensor apertures may be machined into the housing shell to provide a view of an external real-world environment to one or more sensors that are to be mounted internal to the housing shell. As a specific but non-limiting example, the shell housing and integrated boss clusters may be affixed to a machine bed of a multi-axis computer numerical control (CNC) machine. Then, the multi-axis CNC machine may be caused to run one or more CNC programs to flatten and tap the bosses and also to cut one or more holes into the housing shell so serve as sensor apertures. It will be appreciated that since the one or more CNC programs may be used to machine features into the housing shell and also one or more boss clusters without removing the same from the machine bed, the various machined features can be located with respect to one another to a much higher degree of precision than in conventional NED devices since the effect of geometric tolerance stack up is mitigated.

Following completion of the one or more CNC programs, hardware components of the NED device may be mounted to the bosses that are now integrated directly into the housing shell. As a specific but non-limiting example, one or more sensors may be mounted into a sensor aperture by fastening the sensors to bosses that are located adjacent to the sensor aperture. Additionally, or alternatively, a display may be mounted to one or more bosses and may protrude out of a lower portion of the housing shell, e.g. into a field of view of a user if the NED device is being worn by the user. In this way, the housing shell serves as a support structure while also serving both protective and aesthetic purposes.

It should be appreciated any reference to "first," "second," etc. items and/or abstract concepts within the description is not intended to and should not be construed to necessarily correspond to any reference of "first," "second," etc. elements of the claims. In particular, within this Detailed Description and/or the previous Summary, items and/or abstract concepts such as, for example, boss clusters, individual bosses, and/or metallic inserts may be distinguished by numerical designations without such designations corresponding to the claims or even other paragraphs of the Summary and/or Detailed Description. For example, any designation of a "first boss cluster" and "second boss cluster" within a paragraph of this disclosure is used solely to distinguish two different boss clusters within that specific paragraph—not any other paragraph and particularly not the claims.

FIGS. 1A-6 illustrate/describe various alternate embodiments of NED device housings having housing shells that are integrated with pre-molded boss clusters for precision mounting of hardware components. Specific details being illustrated/described with another specific detail or, alternatively, apart from another specific detail is not intended to be construed as a limitation. Thus, any individual detail illustrated in and/or described with respect to any figure herein may be combined in practically any manner with any other individual detail illustrated in and/or described with respect to any other figure herein. Other individual details illustrated and/or described throughout this disclosure shall be interpreted accordingly.

The presently disclosed techniques are believed to be applicable to a variety of devices and manufacturing processes involving integrating housing shells with pre-molded boss clusters for precision mounting of hardware components. Aspects of this disclosure are predominantly disclosed in the context of a Near-Eye-Display (NED) device having a housing shell that is integrated with molded boss clusters for precision mounting of hardware components. While the presently disclosed techniques are not necessarily limited to such specific applications, an appreciation of various aspects of the disclosed techniques is best gained through a discussion of examples in the aforementioned contexts. However, the techniques described herein are equally applicable to integrating molded boss clusters with housing for a variety of other types of components such as, for example, laptop computers, smart watches, and so on. These and other variations shall be considered variations that do not depart from the present disclosure.

EXAMPLE CLAUSES

The disclosure presented herein may be considered in view of the following clauses.

Example Clause A, a Near-Eye-Display (NED) device, comprising: at least one boss cluster that includes at least one mounting surface and at least one boss that protrudes from the at least one mounting surface; a housing shell that includes at least one interior surface defining an interior region of the housing shell, wherein the housing shell is formed through a molding process that cures the housing shell in a desired form and integrates the at least one mounting surface of the at least one boss cluster with the at least one interior surface of the housing shell; and one or more hardware components that are mechanically fastened to the at least one boss within the interior region of the housing shell.

Example Clause B, the NED device of Example Clause A, wherein the at least one boss cluster is formed from a first material and the housing shell is formed from a second material that adheres to the first material during the mold process.

Example Clause C, the NED device of any one of Example Clauses A through B, wherein the one or more hardware components include at least one sensor that is mounted to the at least one boss and is disposed over a sensor aperture that has been machined into the housing shell subsequent to the molding process.

Example Clause D, the NED device of any one of Example Clauses A through C, wherein the one or more hardware components include a display component that is mounted to the at least one boss and that protrudes from the interior region of the housing shell to generate imagery with a field of view.

Example Clause E, the NED device of any one of Example Clauses A through D, wherein the at least one boss cluster is formed from a thermoplastic material and the housing shell is formed from a fiber-reinforced thermosetting polymer.

Example Clause F, the NED device of any one of Example Clauses A through E, wherein a heat deflection temperature of the thermoplastic material is higher than a curing temperature that initiates curing of the fiber-reinforced thermosetting polymer.

Example Clause G, the NED device of any one of Example Clauses A through F, wherein the one or more hardware components are mechanically fastened to at least one metallic insert that is embedded within the at least one boss that protrudes from the at least one mounting surface.

Example Clause H, an apparatus, comprising: a molded boss cluster that is formed from a first material and that includes a plurality of bosses that protrude from a mounting surface; a housing shell that is formed from a second material and that includes an interior region defined by at least one interior surface of the housing shell, wherein the housing shell is cured through a molding process that causes the interior surface of the housing shell to adhere to the mounting surface of the molded boss cluster; and one or more hardware components that are mechanically fastened to the plurality of bosses within the interior region of the housing shell.

Example Clause I, the apparatus of Example Clause H, wherein the second material is a fiber-reinforced thermosetting polymer.

Example Clause J, the apparatus of any one of Example Clauses H through I, wherein the first material is a thermoplastic material having a heat deflection temperature that is higher than a curing temperature that initiates curing of the fiber-reinforced thermosetting polymer.

Example Clause K, the apparatus of any one of Example Clauses H through J, wherein the one or more hardware components include at least one sensor that is mounted to at least one boss and that is disposed over a sensor aperture within the housing shell.

Example Clause L, the apparatus of any one of Example Clauses H through K, wherein the one or more hardware components are mechanically fastened to metallic inserts that are embedded within the plurality of bosses.

Example Clause M, a method for forming a component housing that is integrated with one or more pre-formed boss clusters for precision mounting of hardware components, the method comprising: inserting the one or more pre-formed boss clusters into one or more corresponding boss cluster cavities within a housing shell mold core; disposing a housing shell material over the housing shell mold core and the one or more pre-formed boss clusters that are inserted within the one or more corresponding boss cluster cavities; compressing the housing shell material between the housing shell mold core and a housing shell mold cavity; initiating a molding process to cause the housing shell material to: cure into a form defined by the housing shell mold core and the housing shell mold cavity, and to adhere to the one or more mounting surfaces of the one or more pre-formed boss clusters; and subsequent to the molding process, separating the housing shell mold core and the housing shell mold cavity to remove the component housing that is integrated with the one or more pre-formed boss clusters.

Example Clause N, the method of Example Clause M, wherein individual mounting surfaces of individual pre-formed boss clusters match a curvature of the housing shell mold core surrounding corresponding housing shell mold cavities into the individual pre-formed boss clusters are inserted.

Example Clause O, the method of any one of Example Clauses M through N, wherein the housing shell material includes a fiber-reinforced polymer fabric and a polymer resin that adheres to the mounting surfaces of the one or more pre-formed boss clusters during the molding process.

Example Clause P, the method of any one of Example Clauses M through O, wherein the molding process is a thermal compression molding process, and wherein the housing shell material includes a thermoset polymer resin that adheres to the mounting surfaces of the one or more pre-formed boss clusters during the thermal compression molding process.

Example Clause Q, the method of any one of Example Clauses M through P, wherein the thermal compression molding process includes raising a temperature of the housing shell material to a cure temperature that is less than a heat deflection temperature of the one or more pre-formed boss clusters that are inserted within the one or more corresponding boss cluster cavities.

Example Clause R, the method of any one of Example Clauses M through Q, wherein the housing shell material is a fiber-reinforced thermosetting polymer fabric that cures at a lower temperature than the one or more pre-formed boss clusters.

Example Clause O, the method of any one of Example Clauses M through R, further comprising: initiating one or more computer numerical control machine (CNC) programs to cause a CNC machine to cut one or more sensor apertures into a housing shell of the component housing and to machine threaded mounting holes into individual bosses of the one or more pre-formed boss clusters.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A Near-Eye-Display (NED) device, comprising:
at least one boss cluster that is formed from a thermoplastic material, wherein the at least one boss cluster includes at least one mounting surface and at least one boss that protrudes from the at least one mounting surface;
a housing shell that is formed from a fiber-reinforced thermosetting polymer, wherein the housing shell includes at least one interior surface defining an interior region of the housing shell, wherein the housing shell is formed through a molding process that cures the housing shell in a desired form and integrates the at least one mounting surface of the at least one boss cluster with the at least one interior surface of the housing shell; and one or more hardware components that are mechanically fastened to the at least one boss cluster within the interior region of the housing shell.

2. The NED device of claim 1, wherein the one or more hardware components include at least one sensor that is mounted to the at least one boss and is disposed over a sensor aperture that has been machined into the housing shell subsequent to the molding process.

3. The NED device of claim 1, wherein the one or more hardware components include a display component that is mounted to the at least one boss and that protrudes from the interior region of the housing shell to generate imagery with a field of view.

4. The NED device of claim 1, wherein a heat deflection temperature of the thermoplastic material is higher than a curing temperature that initiates curing of the fiber-reinforced thermosetting polymer.

5. The NED device of claim 1, wherein the one or more hardware components are mechanically fastened to at least one metallic insert that is embedded within the at least one boss cluster that protrudes from the at least one mounting surface.

6. An apparatus, comprising:
   a molded boss cluster that is formed from a first material and that includes a plurality of bosses that protrude from a mounting surface;
   a housing shell that is formed from a second material and that includes an interior region defined by at least one interior surface of the housing shell, wherein the housing shell is cured through a molding process that causes the interior surface of the housing shell to adhere to the mounting surface of the molded boss cluster, and wherein the second material is a fiber-reinforced thermosetting polymer; and
   one or more hardware components that are mechanically fastened to the plurality of bosses within the interior region of the housing shell.

7. The apparatus of claim 6, wherein the first material is a thermoplastic material having a heat deflection temperature that is higher than a curing temperature that initiates curing of the fiber-reinforced thermosetting polymer.

8. The apparatus of claim 6, wherein the one or more hardware components include at least one sensor that is mounted to at least one boss and that is disposed over a sensor aperture within the housing shell.

9. The apparatus of claim 6, wherein the one or more hardware components are mechanically fastened to metallic inserts that are embedded within the plurality of bosses.

10. A method for forming a component housing that is integrated with one or more pre-formed boss clusters for precision mounting of hardware components, the method comprising:
    inserting the one or more pre-formed boss clusters into one or more corresponding boss cluster cavities within a housing shell mold core;
    disposing a housing shell material over the housing shell mold core and the one or more pre-formed boss clusters that are inserted within the one or more corresponding boss cluster cavities;
    compressing the housing shell material between the housing shell mold core and a housing shell mold cavity;
    initiating a molding process to cause the housing shell material to:
      cure into a form defined by the housing shell mold core and the housing shell mold cavity, and
      to adhere to the one or more mounting surfaces of the one or more pre-formed boss clusters; and
    subsequent to the molding process, separating the housing shell mold core and the housing shell mold cavity to remove the component housing that is integrated with the one or more pre-formed boss clusters.

11. The method of claim 10, wherein individual mounting surfaces of individual pre-formed boss clusters match a curvature of the housing shell mold core surrounding corresponding housing shell mold cavities into the individual pre-formed boss clusters are inserted.

12. The method of claim 10, wherein the housing shell material includes a fiber-reinforced polymer fabric and a polymer resin that adheres to the mounting surfaces of the one or more pre-formed boss clusters during the molding process.

13. The method of claim 10, wherein the molding process is a thermal compression molding process, and wherein the housing shell material includes a thermoset polymer resin that adheres to the mounting surfaces of the one or more pre-formed boss clusters during the thermal compression molding process.

14. The method of claim 13, wherein the thermal compression molding process includes raising a temperature of the housing shell material to a cure temperature that is less than a heat deflection temperature of the one or more pre-formed boss clusters that are inserted within the one or more corresponding boss cluster cavities.

15. The method of claim 10, wherein the housing shell material is a fiber-reinforced thermosetting polymer fabric that cures at a lower temperature than the one or more pre-formed boss clusters.

16. The method of claim 10, further comprising:
    initiating one or more computer numerical control machine (CNC) programs to cause a CNC machine to cut one or more sensor apertures into a housing shell of the component housing and to machine threaded mounting holes into individual bosses of the one or more pre-formed boss clusters.

* * * * *